(12) United States Patent
Sakai et al.

(10) Patent No.: US 11,112,345 B2
(45) Date of Patent: Sep. 7, 2021

(54) MICROPARTICLE MEASUREMENT DEVICE AND CLEANING METHOD FOR MICROPARTICLE MEASUREMENT DEVICE

(71) Applicant: SONY CORPORATION, Tokyo (JP)

(72) Inventors: Yoshitsugu Sakai, Kanagawa (JP); Masaaki Abe, Kanagawa (JP); Koichi Tsukihara, Kanagawa (JP); Shoji Akiyama, Kanagawa (JP); Shinichi Hasegawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 298 days.

(21) Appl. No.: 16/305,885

(22) PCT Filed: Mar. 7, 2017

(86) PCT No.: PCT/JP2017/008877
§ 371 (c)(1),
(2) Date: Nov. 29, 2018

(87) PCT Pub. No.: WO2017/212718
PCT Pub. Date: Dec. 14, 2017

(65) Prior Publication Data
US 2020/0319081 A1    Oct. 8, 2020

(30) Foreign Application Priority Data

Jun. 10, 2016 (JP) .............................. JP2016-116693

(51) Int. Cl.
*G01N 15/14* (2006.01)
(52) U.S. Cl.
CPC ................. *G01N 15/1434* (2013.01)

(58) Field of Classification Search
CPC ...... G01N 21/05; G01N 33/49; G01N 21/648; G01N 21/7703; G01N 31/224;
(Continued)

(56) References Cited

U.S. PATENT DOCUMENTS 4,952,055 A * 8/1990 Wyatt ................ G01N 21/4133
356/128
5,155,543 A * 10/1992 Hirako ............... G01N 15/1431
356/343

(Continued)

FOREIGN PATENT DOCUMENTS

CN    102159934 A    8/2011
CN    102323191 A    1/2012
(Continued)

OTHER PUBLICATIONS

Office Action for JP Patent Application No. 2018-522327, dated Sep. 1, 2020, 04 pages of Office Action and 04 pages of English Translation.

(Continued)

*Primary Examiner* — Michael P Stafira
(74) *Attorney, Agent, or Firm* — Chip Law Group (57) ABSTRACT

Provided is a microparticle measurement device including a light emission unit that emits light to a microparticle to be analyzed and a light detection unit that detects light generated from the microparticle at a predetermined detection position. The microparticle measurement device further includes an analysis unit that is connected to the light detection unit and analyzes a detection value of the light detected by the light detection unit. The light detection unit is movable from the detection position.

11 Claims, 9 Drawing Sheets

(58) Field of Classification Search
CPC ........... G01N 33/0004; G01N 33/0037; G01N 33/0044; G01N 33/0047; G01N 33/497; G01N 1/30; G01N 2015/0065; G01N 2021/6482; G01N 2021/7786; G01N 2021/7796; G01N 21/0303; G01N 21/07; G01N 21/17; G01N 21/552; G01N 21/6428; G01N 21/645; G01N 33/54326; G01N 33/54366; G01N 11/00; G01N 15/1436; G01N 15/1463; G01N 21/63; G01N 21/64; G01N 21/77; G01N 2203/0089; G01N 33/54313; G01N 33/54373; G01N 2033/245; G01N 33/24; G01N 11/14; G01N 15/0806; G01N 15/088; G01N 1/08; G01N 1/28; G01N 1/312; G01N 1/38; G01N 1/4077; G01N 1/44; G01N 2011/0046; G01N 2021/157; G01N 2021/945; G01N 2035/00188; G01N 2035/00514; G01N 2035/0091; G01N 21/94; G01N 21/958; G01N 2201/0635; G01N 2223/418; G01N 2223/6116; G01N 23/046; G01N 23/2202; G01N 23/2251; G01N 33/0016; G01N 33/50; G01N 33/66; G01N 35/00722; G01N 35/1002; G01N 35/1095; G02B 2006/12147; G02B 2006/1215; G02B 27/0955; G02B 27/0972; G02B 27/0977; G02B 6/12016; G02B 6/122; G02B 6/124; G02B 6/34; G02B 6/422; G02B 6/4224; G02B 21/16; G02B 21/26; G02B 21/002; G02B 21/04; G02B 21/125; G02B 21/18; G02B 21/24; G02B 21/28; G02B 21/361; G02B 21/362; G02B 23/2476; G02B 5/32; G01B 11/04; G01B 11/24; G01J 2005/0077; G01J 2005/0085; G01J 5/0265; G01J 5/12

USPC ......................................................... 356/337
See application file for complete search history.

(56) References Cited

U.S. PATENT DOCUMENTS

| 6,532,069 B1 | 3/2003 | Otsuki et al. |
| 2004/0083798 A1* | 5/2004 | Sadar ................. G01N 15/0205 73/53.01 |
| 2010/0137120 A1* | 6/2010 | Wong ............... G01N 33/54313 494/10 |
| 2011/0181869 A1 | 7/2011 | Yamaguchi et al. |

FOREIGN PATENT DOCUMENTS

| EP | 2333516 A1 | 6/2011 |
| GB | 2475458 A | 5/2011 |
| JP | 11-173969 A | 7/1999 |
| JP | 2001-059808 A | 3/2001 |
| JP | 2007-046947 A | 2/2007 |
| JP | 2008-096155 A | 4/2008 |
| JP | 2011-033405 A | 2/2011 |
| JP | 2013-158272 A | 8/2013 |
| JP | 2013-210292 A | 10/2013 |
| JP | 2013-250135 A | 12/2013 |
| KR | 10-2001-0007385 A | 1/2001 |
| TW | 518671 B | 1/2003 |
| WO | 2010/035775 A | 4/2010 |
| WO | 2010/035775 A1 | 4/2010 |

OTHER PUBLICATIONS

International Search Report and Written Opinion of PCT Application No. PCT/JP2017/008877, dated May 16, 2017, 02 pages of translation and 07 pages of ISRWO.
Office Action for DE Patent Application No. 112017002897.3 dated Dec. 7, 2020, 5 pages of Office Action.

* cited by examiner

MICROPARTICLE MEASUREMENT DEVICE AND CLEANING METHOD FOR MICROPARTICLE MEASUREMENT DEVICE

CROSS REFERENCE TO RELATED APPLICATIONS

This application is a U.S. National Phase of International Patent Application No. PCT/JP2017/008877 filed on Mar. 7, 2017, which claims priority benefit of Japanese Patent Application No. JP 2016-116693 filed in the Japan Patent Office on Jun. 10, 2016. Each of the above-referenced applications is hereby incorporated herein by reference in its entirety.

TECHNICAL FIELD

The present technology relates to a microparticle measurement device and a cleaning method for a microparticle measurement device.

BACKGROUND ART

In recent years, regenerative medicine and cell therapy are active fields of research, and the need for a flow cytometer is increased as a technique to quickly evaluate a cell. The flow cytometer is an analysis technique to analyze and sort a microparticle by detecting fluorescence and scattered light emitted from each microparticle after pouring, into a fluid, microparticles to be analyzed in an aligned state and emitting laser light or the like to the microparticles, and the flow cytometer is used as a tool to analyze a cell in the research on the regenerative medicine and cell therapy. In the above-described research, a flow cytometer capable of performing processing in an aseptic environment is demanded because it is necessary to reduce a risk of cell contamination.

For example, Patent Document 1 discloses a flow cytometer (microparticle measurement device) including: a flow path system to array, in a row, cells colored with fluorescent labeling reagents or the like inside a flow cell; an optical system to detect scattered light and fluorescence by emitting laser light to a cell; and a sorting system to control a moving direction of a droplet ejected to a space outside the flow cell.

CITATION LIST

Patent Document

Patent Document 1: Japanese Patent Application Laid-Open No. 2007-46947

SUMMARY OF THE INVENTION

Problems to be Solved by the Invention

In a device described above, there is a risk that contaminants like aerosol generated during droplet formation are generated and the aerosol contaminates a subsequent sample. Such a problem of cross-contamination between samples, contamination of samples, and the like are major hurdles particularly in the field of flow cytometers.

Therefore, the present technology is mainly directed to providing a technique capable of reducing such a risk of contamination.

Solutions to Problems

In the present technology, first provided is a microparticle measurement device including at least: a light emission unit that emits light to a microparticle to be analyzed; a light detection unit that detects light generated from the microparticle at a predetermined detection position; and an analysis unit that is connected to the light detection unit and analyzes a detection value of the light detected by the light detection unit, in which the light detection unit is movable from the detection position.

In the microparticle measurement device according to the present technology, the light detection unit may be a forward scattered light detection unit.

Additionally, in the microparticle measurement device according to the present technology, the detection position may be a position facing the light emission unit interposing the microparticle and may also be a preset position such that light generated from the microparticle can be detected.

Additionally, in the microparticle measurement device according to the present technology, further provided is a rotational shaft portion that is connected to the light detection unit and defines a predetermined rotational axis, in which the light detection unit may be rotatable around the predetermined axis with respect to the detection position. In this case, the light detection unit may be movable upward with respect to the detection position while being rotated around the predetermined axis.

Additionally, in the microparticle measurement device according to the present technology, the light detection unit may be movable in at least one of a horizontal direction or a vertical direction with respect to the detection position.

Furthermore, in the microparticle measurement device according to the present technology, further provided is a housing in which the light emission unit and the analysis unit are housed, in which the light detection unit can be completely separated from the housing.

Furthermore, in the microparticle measurement device according to the present technology, the analysis unit may be electrically connected to the light detection unit.

Additionally, in the microparticle measurement device according to the present technology, the light detection unit may include a light receiving element that receives light generated from the microparticle. In this case, the light detection unit may include a light shielding portion that is arranged between the light emission unit and the light receiving element and shields a part of light generated from the microparticle.

Further, in the microparticle measurement device according to the present technology, further provided are: a housing in which the light emission unit and the analysis unit are housed; and a cover detachable from the housing, in which the light detection unit can be covered with the cover.

Furthermore, in the present technology, provided is a cleaning method for a microparticle measurement device, including cleaning the microparticle measurement device by moving a light detection unit from a detection position in the microparticle measurement device including at least: a light emission unit that emits light to a microparticle to be analyzed; the light detection unit that detects light generated from the microparticle at the predetermined detection position; and an analysis unit that is connected to the light detection unit and analyzes a detection value of the light detected by the light detection unit, the light detection unit being movable from the detection position.

In the present technology, the "microparticle" broadly includes, for example: biologically relevant microparticles such as cells, microbes, and liposomes; synthetic particles such as a latex particle, a gel particle, a particle for an industrial use; or the like.

Additionally, the biologically relevant microparticles include a chromosome, a liposome, a mitochondrion, an organelle (cell organ), and the like constituting various kinds of cells. The cells include animal cells (such as hematopoietic cell) and plant cells. The microbes include: bacteria such as coli bacilli; viruses such as tobacco mosaic viruses; fungi such as yeast; and the like. Additionally, the biologically relevant microparticles can also include biologically relevant polymers such as nucleic acids, proteins, and a complex thereof. Additionally, the particle for an industrial use may be, for example, an organic or inorganic polymer material, a metal, or the like. The organic polymer materials include polystyrene, styrene-divinylbenzene, polymethyl methacrylate, and the like. The inorganic polymer materials include glass, silica, a magnetic material, and the like. The metal includes gold colloid, aluminum, and the like. These microparticles generally have a spherical shape, but in the present technology, it may be non-spherical, and a size, mass, and the like thereof are not particularly limited.

Effects of the Invention

According to the present technology, a risk of contamination can be reduced. Note that the effect recited herein is not necessarily limited and may be any one of those recited in the present disclosure.

MODE FOR CARRYING OUT THE INVENTION

Preferred embodiments to carry out the present technology will be described below with reference to the drawings. Note that the embodiments described below illustrate examples of representative embodiments of the present technology and the scope of the present technology should not be interpreted to be limited by these embodiments. Note that the description will be provided in the following order.

1. Microparticle Measurement Device 100 (First Embodiment and Second Embodiment)
   (1) Light Emission Unit 103
   (2) Light Detection Unit 104
   (3) Analysis Unit 105
2. Microparticle Measurement Device 100 (Third Embodiment and Fourth Embodiment)
   (1) Flow Path P
   (1-1) Microparticle Measurement Chip M
   (1-2) Flow Cell P
   (2) Sample feeding unit 101
   (3) Fluid Control Unit 102
   (4) Connection Member C
   (5) Light Emission Unit 103
   (6) Light Detection Unit 104
   (7) Analysis Unit 105
   (8) Sorting Unit 106 (Including Charging Unit 1061)
   (9) Storage Unit 107
   (10) Display Unit 108
   (11) Input Unit 109
   (12) Control Unit 110
   (13) Others
3. Cleaning Method for Microparticle Measurement Device 1. Microparticle Measurement Device 100

Figure 1:
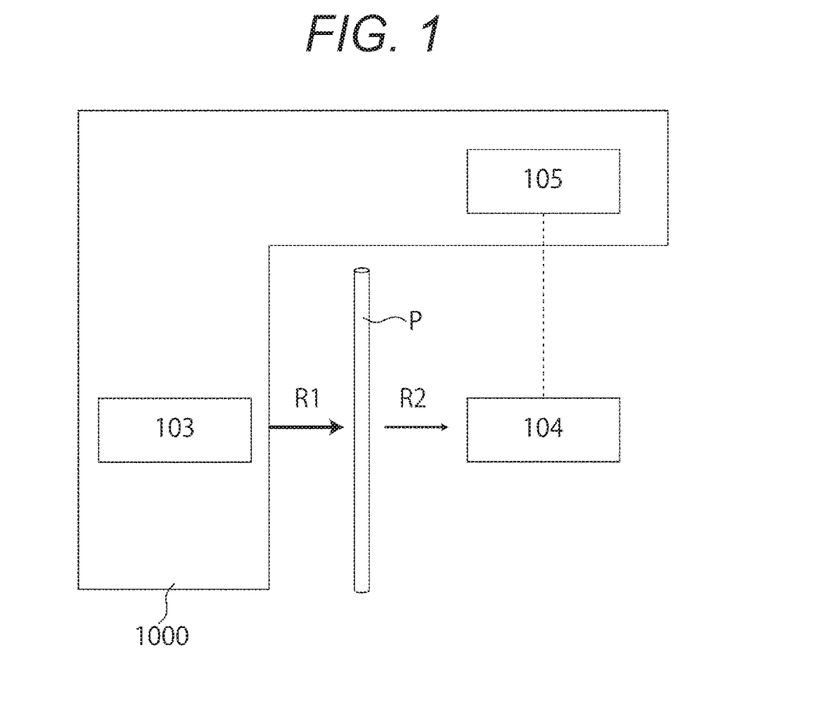
FIG. 1 is a schematic conceptual diagram schematically illustrating a first embodiment of a microparticle measurement device 100 according to the present technology.

FIG. 1 is a schematic conceptual view schematically illustrating a first embodiment of a microparticle measurement device 100 according to the present technology.

The microparticle measurement device 100 according to the present technology includes at least a light emission unit 103, a light detection unit 104, and an analysis unit 105. Additionally, a housing 1000 to house the light emission unit 103 and the analysis unit 105 may be further included as needed.

Each of the units will be described in detail below.

(1) Light Emission Unit 103

The light emission unit 103 emits light to a microparticle to be analyzed. A kind of light emitted from the light emission unit 103 is not particularly limited, but light having a constant light direction, a constant wavelength, and constant light intensity is preferable in order to reliably generate fluorescence and scattered light from a particle. Specifically, for example, a laser, an LED, or the like can be exemplified. In a case of using a laser, a kind thereof is not particularly limited, but it is also possible to use one kind or two or more kinds of combination of: an argon (Ar) ion laser, a helium-neon (He—Ne) laser, a dye laser, a krypton (Cr) laser, a semiconductor laser, a solid laser or the like in which a semiconductor laser is combined with a wavelength conversion optical element, or the like. In the microparticle measurement device 100 illustrated in the first embodiment, the light emission unit is housed and arranged inside the housing 1000. On the other hand, in a case where the light emission unit is not housed in the housing 1000, the light emission unit can have a configuration movable from a predetermined light emitting position in a manner similar to the light detection unit 104 described below.

(2) Light Detection Unit 104

The light detection unit 104 detects light generated from the microparticle at a predetermined detection position. In the microparticle measurement device 100 according to the first embodiment, the light detection unit 104 is movable from the detection position. There is a high risk of contamination by aerosol or the like in a periphery of a place where a microparticle flows, and it is desired that the light detection unit 104, housing 1000, and the like arranged in the periphery thereof are cleaned per sample, and cleaning can be performed by moving the light detection unit 104 from the detection position, thereby reducing a burden on an operator.

Additionally, since contaminants such as aerosol can be removed smoothly, a risk of contamination by aerosol and a risk of biohazard such as infection and exposure to an operator can be reduced.

Figure 2:
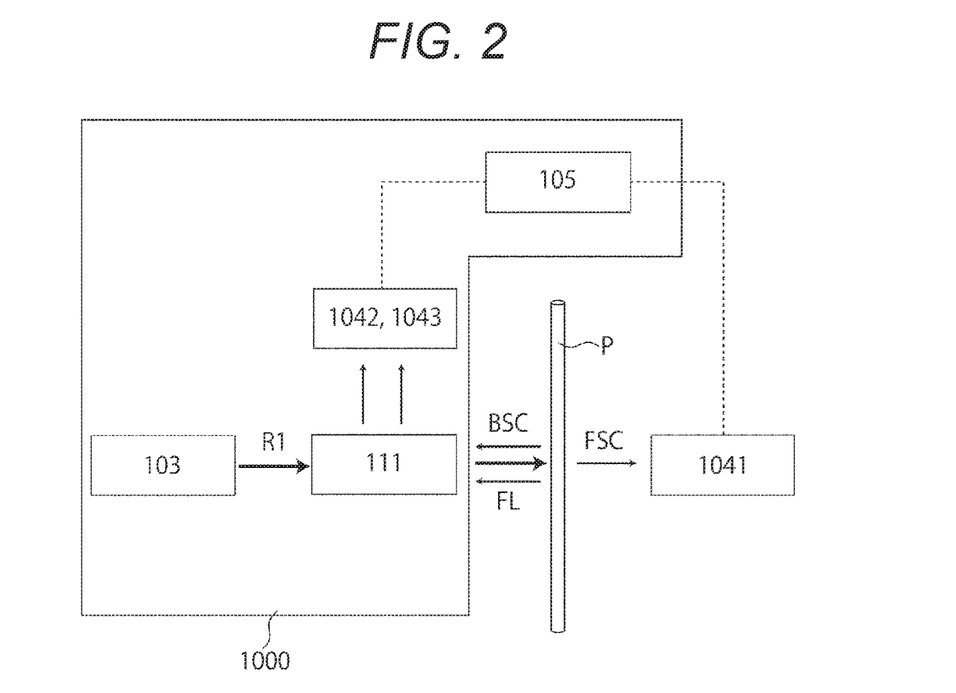
FIG. 2 is a schematic conceptual diagram schematically illustrating a second embodiment of a microparticle measurement device 100 according to the present technology.

In the present technology, the light detection unit 104 emits light to a microparticle flowing inside a flow path and detects light components of fluorescence (FL), forward scattered light (FSC), backscattered light (BSC), and the like generated from the microparticle by the light emission. The fluorescence and necessary scattered light components are important light components to obtain optical information (characteristics) of the microparticle. FIG. 2 is a conceptual diagram schematically illustrating a second embodiment of a microparticle measurement device 100 in which detection units to receive fluorescence, forward scattered light, and backscattered light are separately provided.

A forward scattered light detection unit 1041 detects forward scattered light generated from a microparticle to which light (excitation light) is emitted from a light source. The forward scattered light is light scattered from a microparticle to which the excitation light is emitted at an angle of generally about 6° to 9° with respect to an optical axis of the light from the light source, and mainly information regarding a size of the microparticle can be obtained from this light. As illustrated in FIG. 2, the forward scattered light detection unit 1041 in the second embodiment is preferably arranged at a position facing the light emission unit 103 interposing the microparticle.

Additionally, as for a fluorescence detection unit 1042 in the second embodiment, since fluorescence is emitted in a direction different from an incident direction of the emitted light, the fluorescence detection unit 1042 can also be arranged, for example, on a side same as the light emission unit 103 or on a side of 90 degrees from a side surface thereof on the basis of the flow path P in the present technology.

Furthermore, since the backscattered light is the light scattered from a microparticle in a direction of about 180° with respect to the optical axis of the emitted light, the backscattered light detection unit 1043 in the second embodiment is preferably arranged on a side same as the light emission unit 103. The backscattered light is scattered light from which information regarding an internal structure of a microparticle can be obtained, and there is lateral scattered light as the scattered light from which similar information can be obtained. Since the lateral scattered light is light scattered from a microparticle scattered in a direction of about 90° with respect to the optical axis of the emitted light, arrangement at a position perpendicular to the light emission unit 103 with respect to a microparticle is preferable.

As described above, each of the light detection units can be set at a preset position so as to be able to detect light generated from a microparticle.

In the microparticle measurement device 100 illustrated in the second embodiment, since the fluorescence detection unit 1042 and the backscattered light detection unit 1043 are housed in the housing 1000, it is preferable that the forward scattered light detection unit 1041 be movable. On the other hand, the present invention is not limited to this form, and in a case where there is no housing 1000, all of the light detection units may be movable, and the light detection units other than the forward scattered light detection unit 1041 may be movable depending on an arrangement position of the housing 1000.

Figure 3:
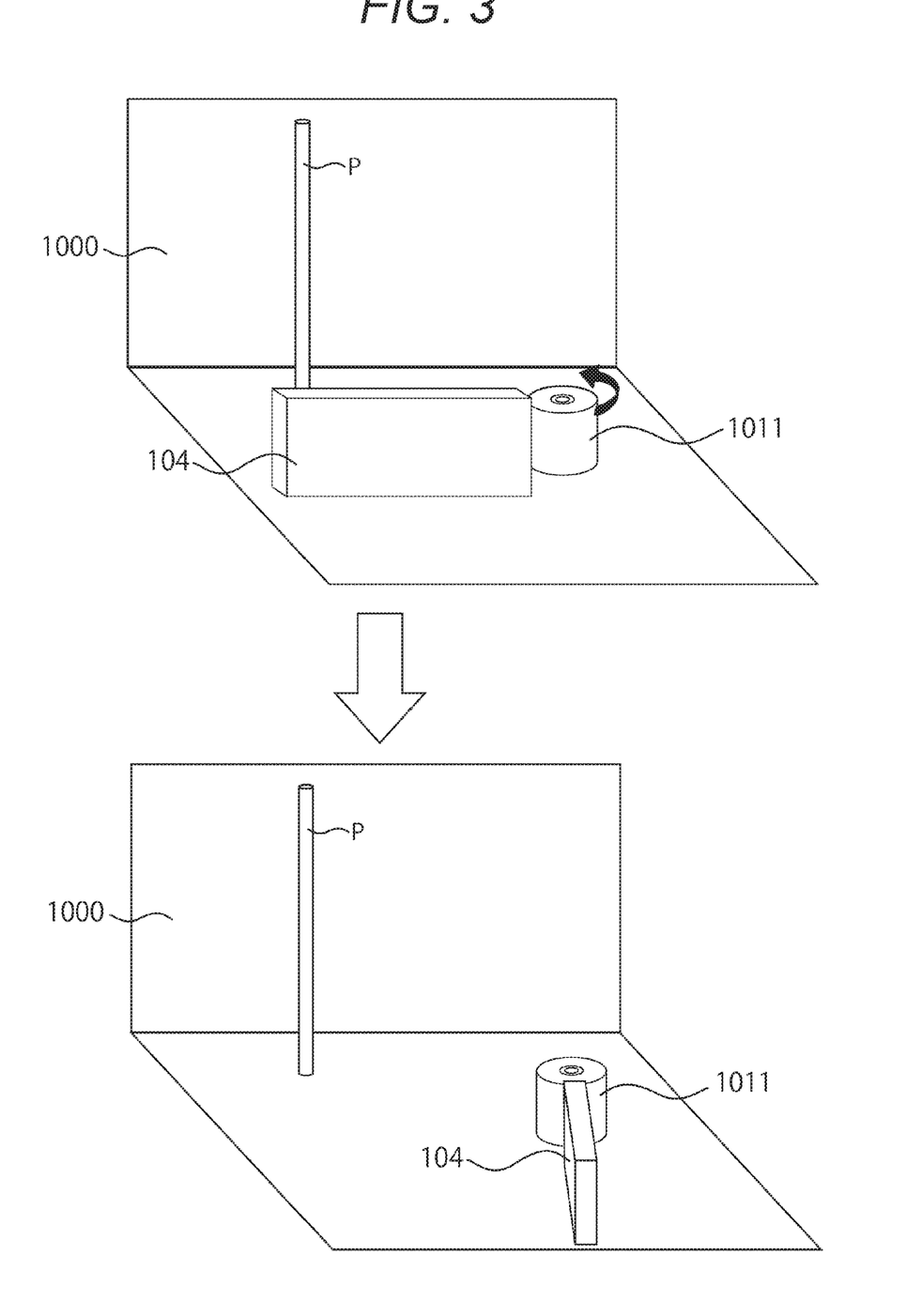
FIG. 3 is a schematic diagram illustrating an exemplary state of moving a light detection unit 104.

Additionally, as illustrated in FIG. 3, the present technology further includes a rotational shaft portion 1011 that is connected to the light detection unit 104 and defines a predetermined rotational axis, and the light detection unit 104 is rotatable around the predetermined axis with respect to the detection position. With this configuration, an operator can easily move the light detection unit 104. A rotation angle in this case is not particularly limited, and may be, for example, about 90° as illustrated in FIG. 3.

In this case, the light detection unit 104 may be movable upward with respect to the detection position while being rotated around the predetermined axis. With this configuration, the light detection unit 104 to be moved can be prevented from rubbing against a surface immediately below the light detection unit 104, and an operator can easily move the light detection unit 104.

Furthermore, in the present technology, the light detection unit 104 may be not only movable by the above-described rotational movement but also movable in at least one of a horizontal direction or a vertical direction with respect to the detection position.

Additionally, in the present technology, the light detection unit 104 can be completely separated from the housing 1000 that houses at least the above-described light emission unit 103 and analysis unit 105. With this configuration, the housing 1000 is easily cleaned and the risk of contamination by aerosol and the like can be reduced.

Furthermore, in the present technology, it is possible to include a cover detachable from the above-described housing 1000, and the light detection unit 104 can be covered with the cover. With this configuration, for example, garbage such as dust can be prevented from entering the light detection unit 104.

In the present technology, as far as light from a microparticle can be detected, a type of the light detection unit 104 is not particularly limited and a known photodetector can be freely selected and adopted. For example, one type or two or more types of following measurement instruments can be freely combined and adopted: a fluorescence measurement instrument, a scattered light measurement instrument, a transmitted light measurement instrument, a reflected light measurement instrument, a diffracted light measurement instrument, an ultraviolet spectrometer, an infrared spectrometer, a Raman spectrometer, a FRET measurement instrument, a FISH measurement instrument, other various spectrum measurement instruments, a so-called multi-channel photodetector in which a plurality of photodetectors is arranged in an array, and the like.

Furthermore, in the present technology, the light detection unit 104 preferably has a light receiving element that receives light generated from the microparticle. Examples of the light receiving element can include an area imaging element such as a CCD or a CMOS element, a PMT, a photodiode, and the like.

Furthermore, in the present technology, the light detection unit 104 can include a plurality of light receiving elements having different detection wavelength bands. Since the light detection unit 104 includes the plurality of light receiving elements having the different detection wavelength bands, intensity of light in a continuous wavelength band can be measured as a fluorescence spectrum. Specifically, for example, it is possible to exemplify a PMT array or photodiode array in which light receiving elements are arranged one-dimensionally, or the one in which a plurality of independent detection channels such as two-dimensional light receiving elements like CCDs, CMOSs, or the like are arranged.

On the other hand, in a case of adopting the above-described movable light detection unit 104, it is found that an error is more likely to occur in reproducibility of an installing position than in a case of adopting a fixed type light detection unit. For example, while the fixed type is fixed with an error of about 20 μm, the movable type may be installed with an error of about 100 μm. This error leads to a measurement error and the like as a result.

Additionally, in a light detection unit including a commonly used optical fiber, there is concern about reliability including damage during movement. Furthermore, in a case of using an optical fiber having a diameter of 250 μm, for example, an allowable error is about 50 μm, and assumed is a case where a problem of exceeding this allowable error range is caused in a mobile light detection unit with low reproducibility of an installation position.

Additionally, in a case of using an optical fiber having a large diameter of about 750 μm, reproducibility of an installation position can be secured, but an optical system having a small numerical aperture (NA) is formed instead, and the device becomes huge because a focal length is elongated.

As another method, it is possible to provide a design in which magnifications of a collimator lens and a condensing lens are adjusted, but this requires a single focal lens with a high NA and increases a cost for an entire device.

Figure 4A:
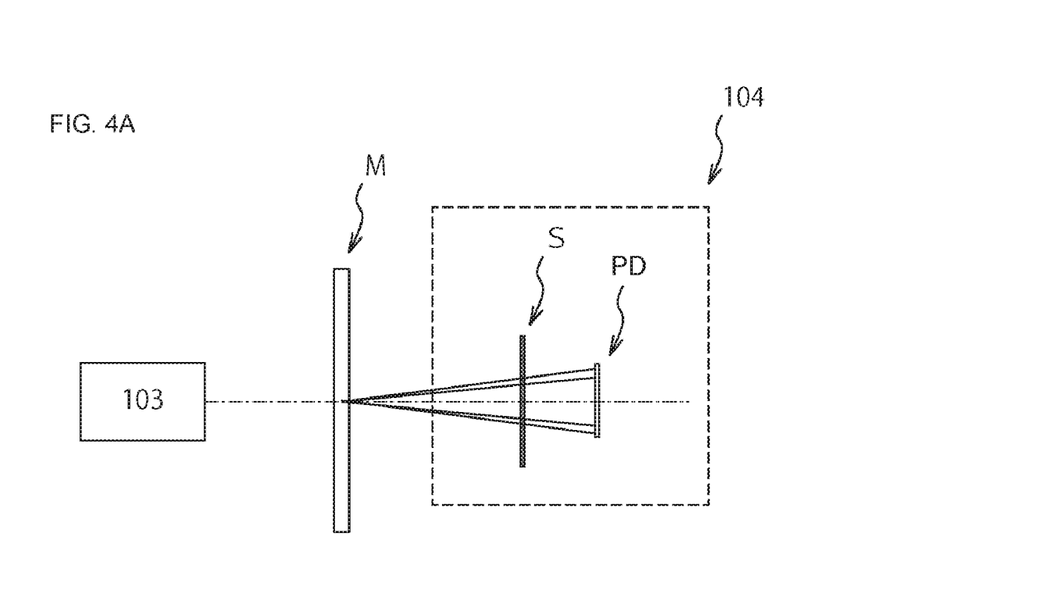
FIG. 4A is a schematic view illustrating a state when light is emitted from a light emission unit 103 to a microparticle measurement chip M described later in the microparticle measurement device 100 according to the present technology.

Considering this, in the light detection unit 104 of the present technology, it is preferable to directly irradiate a light receiving element PD without using a lens optical system. For example, the light detection unit 104 illustrated in FIGS. 4A and 4B includes the light receiving element PD and additionally a light shielding portion S, and the light shielding portion S is arranged between the light emission unit 103 and the light receiving element PD. FIG. 4A is a schematic view illustrating a state when light is emitted from the light emission unit 103 to a microparticle measurement chip M described later, and FIG. 4B is a schematic view illustrating an example form of the light shielding portion S.

Figure 4B:
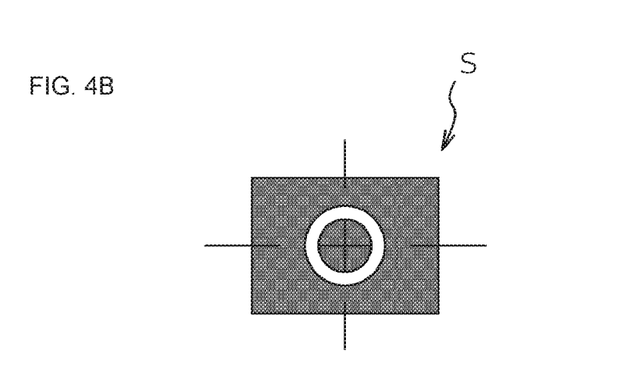
FIG. 4B is a schematic view illustrating an example form of a light shielding portion S.

As illustrated in FIGS. 4A and 4B, since a configuration in which scattered light is emitted directly to the light receiving element PD via the light shielding portion S is provided, in a case where the PD has a size of 10 mm, for example, it is possible to achieve a state of a level not causing a problem even when there is a deviation amount of about 300 μm.

This can reduce a measurement error caused by an error of an installation position and can suppress the device from becoming huge. Additionally, expensive optical parts can be largely reduced and a cost of the device can be cut down.

A material and the like of the light shielding portion S are not particularly limited as far as light generated from a microparticle can be shielded. Additionally, a form of the light shielding portion S is not particularly limited, but it may have the form as illustrated by FIG. 4B, for example.

(3) Analysis Unit 105

The analysis unit 105 is connected to the light detection unit 104 and analyzes a detection value of light to a microparticle detected by the light detection unit 104. Additionally, the analysis unit 105 may also perform various kinds of information processing and control the light emission unit 103, the light detection unit 104, and the like.

In the present technology, the analysis unit 105 can be electrically connected to the light detection unit 104. With this configuration, the light detection unit 104 can be moved with more freedom.

The analysis unit 105 can correct, for example, a detection value of light received from the light detection unit 104 and can calculate a feature quantity of each microparticle. Specifically, the feature quantity indicating a size, a form, an internal structure, and the like of a microparticle is calculated from detection values of the received fluorescence, forward scattered light, and backscattered light. Additionally, a sorting control signal can also be generated by performing sorting determination on the basis of the calculated feature quantity, a sorting condition preliminarily received from the input unit 109, and the like.

The analysis unit 105 is not an indispensable component in the microparticle measurement device 100 according to the present technology, and a state and the like of a microparticle can be analyzed on the basis of a detection value of light detected by the light detection unit 104 by using an external analysis device or the like. For example, the analysis unit 105 may be implemented by a personal computer or a CPU, and can be made to function by the personal computer or the CPU by further storing the same as a program in a hardware resource including recording media (nonvolatile memory (USB memory and the like), a HDD, a CD, and the like) and the like. Additionally, the analysis unit 105 may be connected to each of the units via a network.

2. Microparticle Measurement Device 100

Figure 5:
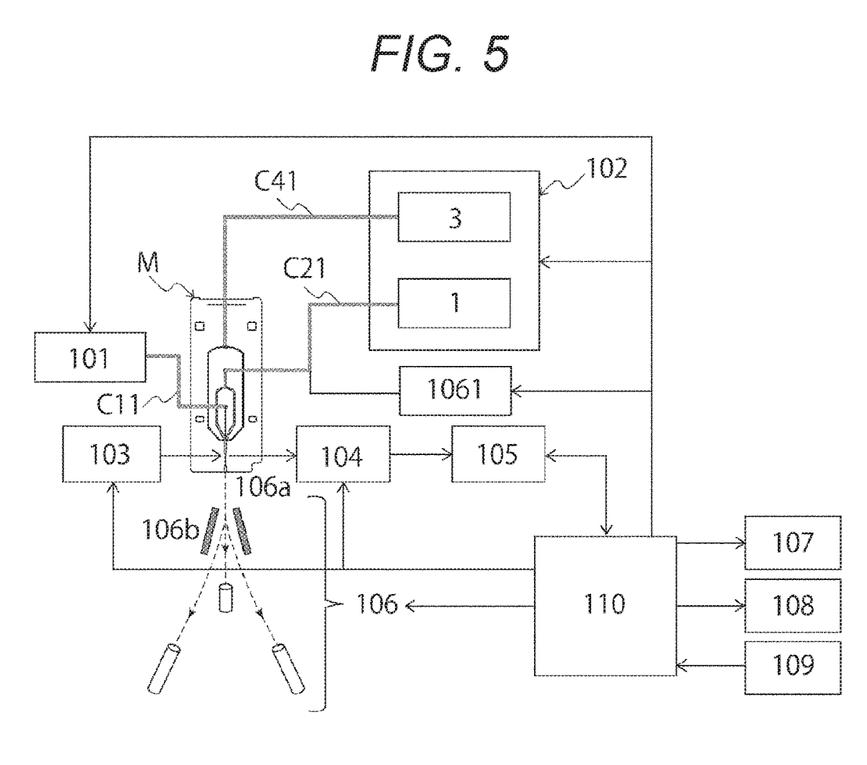
FIG. 5 is a schematic conceptual diagram schematically illustrating a third embodiment of a microparticle measurement device 100 according to the present technology.
Figure 6:
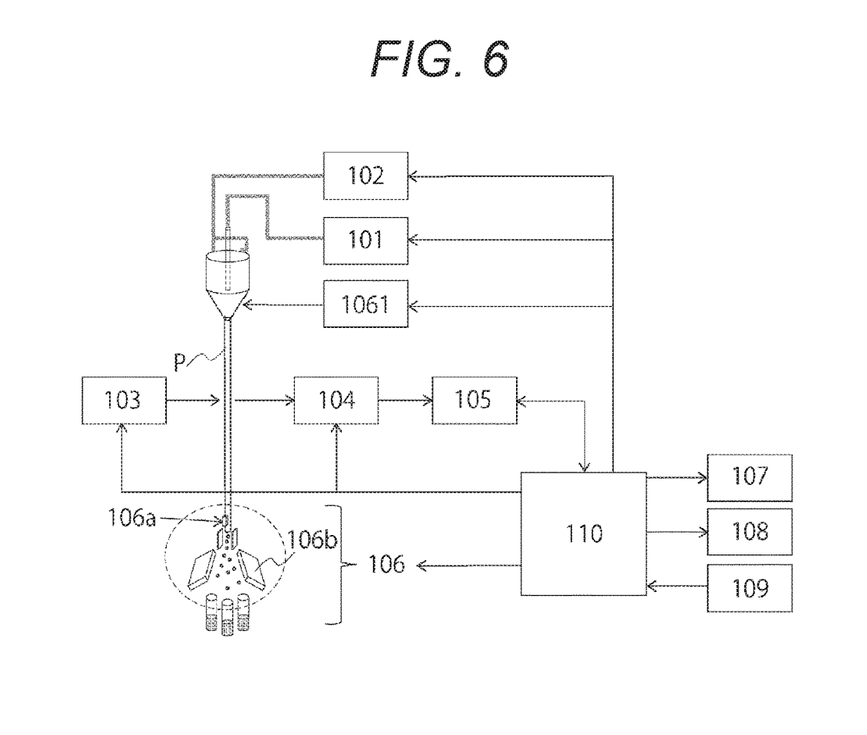
FIG. 6 is a schematic conceptual diagram schematically illustrating a fourth embodiment of a microparticle measurement device 100 according to the present technology.

FIG. 5 is a schematic conceptual diagram schematically illustrating a third embodiment of a microparticle measurement device 100 according to the present technology, and FIG. 6 is a schematic diagram illustrating a fourth embodiment of a microparticle measurement device 100 according to the present technology. The microparticle measurement device 100 according to the present technology may include, as needed, a flow path P, a sample feeding unit 101, a fluid control unit 102, a sorting unit 106, a charging unit 1061, a storage unit 107, a display unit 108, an input unit 109, a control unit 110, and the like.

In FIG. 5, a liquid feeding tube C11 capable of feeding liquid from the sample feeding unit 101, a liquid feeding tube C21 capable of feeding liquid from a sheath liquid feeding unit 1, and a liquid drain tube C41 capable of draining liquid to a liquid drain unit 3 are detachable as needed, and these tubes may be thrown away after one-time use (disposable). Furthermore, a microparticle measurement chip M described later can also be similarly handled, as needed.

Each of the units will be described in detail below.

(1) Flow Path P

The flow path P may be provided in advance in the microparticle measurement device 100 according to the present technology, but analysis or sorting can be performed by installing, in the microparticle measurement device 100, a commercially available flow path P, a disposable chip provided with a flow path P, or the like.

A form of the flow path P that can be used for the microparticle measurement device 100 according to the present technology is not particularly limited and can be freely designed. For example, not limited to a flow path P formed in, for example, a two-dimensional or three-dimensional plastic or glass substrate as illustrated in the microparticle measurement device 100 of FIG. 5, a flow path P including a flow cell used in a conventional flow cytometer as illustrated in the microparticle measurement device 100 of FIG. 6 can also be used in the microparticle measurement device 100 according to the present technology.

Additionally, a flow path width, a flow path depth, and a cross-sectional shape of the flow path P are also not particularly limited and can be freely designed as far as the flow path can form a laminar flow. For example, a micro flow path having a flow path width of 1 mm or less can also be used for the microparticle measurement device 100 according to the present technology. Particularly, a micro flow path having a flow path width of about 10 µm or more and about 1 mm or less can be preferably used in the microparticle measurement device 100 according to the present technology.

(1-1) Microparticle Measurement Chip M

Figure 7A:
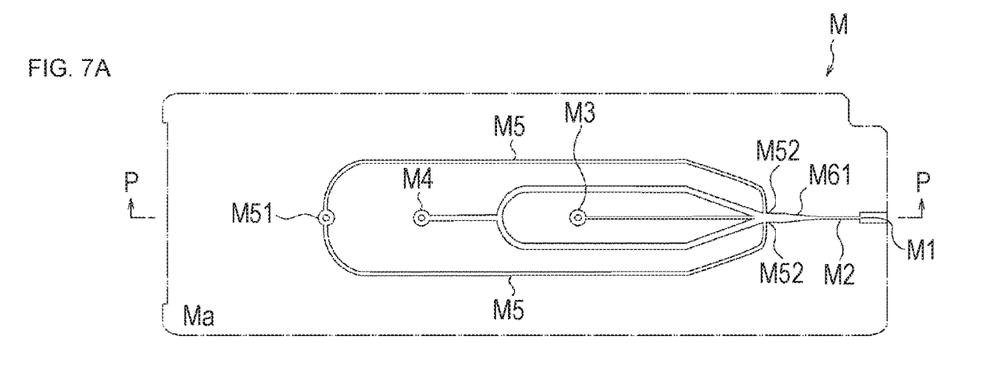
FIGS. 7A and 7B are schematic views illustrating an exemplary configuration of the microparticle measurement chip M that can be used for the microparticle measurement device 100 according to the present technology.
Figure 7B:
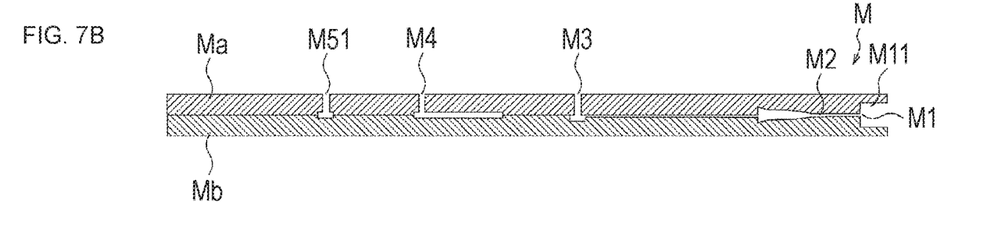
Figure 8A:
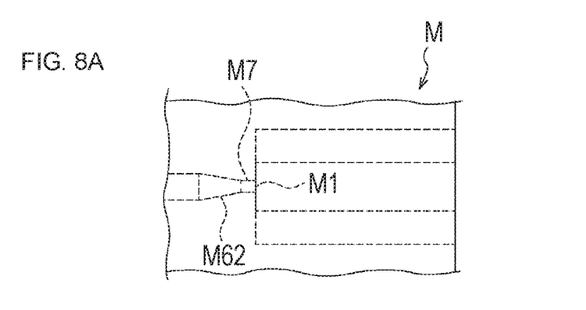
FIGS. 8A, 8B, and 8C are schematic views illustrating an exemplary configuration of an orifice M1 of the microparticle measurement chip M that can be used for the microparticle measurement device 100 according to the present technology.
Figure 8B:
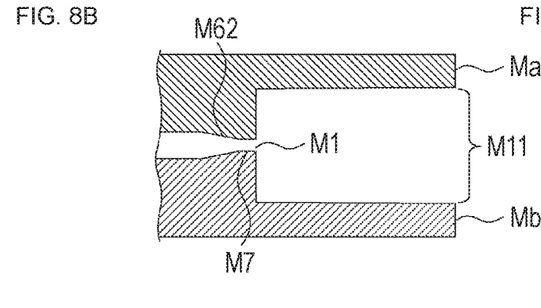
Figure 8C:
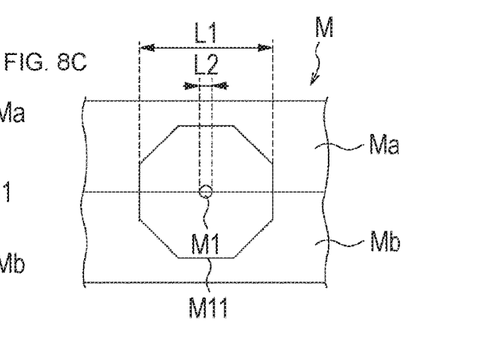

FIGS. 7A and 7B are schematic views illustrating an exemplary configuration of a microparticle measurement chip M that can be used for the microparticle measurement device 100 of FIG. 5, and FIGS. 8A, 8B, and 8C are schematic views illustrating an exemplary configuration of an orifice M1 of the microparticle measurement chip M that can be used for the microparticle measurement device 100 of FIG. 5. FIG. 7A illustrates a schematic top view, and FIG. 7B illustrates a schematic cross-sectional view corresponding to a cross-section P-P in A. Also, FIG. 8A illustrates a top view, FIG. 8B a cross-sectional view, and FIG. 8C a front view. Note that FIG. 8B corresponds to the cross-section P-P in FIG. 7A.

The microparticle measurement chip M is formed by bonding substrate layers Ma and Mb where a sample flow path M2 is formed. The sample flow path M2 can be formed on the substrate layers Ma and Mb by performing injection molding with a thermoplastic resin by using a metal mold. As the thermoplastic resin, it is possible to adopt plastic conventionally known as a material of a microparticle measurement chip, such as polycarbonate, polymethylmethacrylate resin (PMMA), cyclic polyolefin, polyethylene, polystyrene, polypropylene, or polydimethylsiloxane (PDMS).

Additionally, in the microparticle measurement chip M, a sample introduction unit M3 to introduce a sample containing a microparticle, a sheath introduction unit M4 to introduce sheath liquid, and the sample flow path M2 in which a sample flow is introduced and joined with the sheath liquid are formed. The sheath liquid introduced from the sheath introduction unit M4 is fed while being separated in two directions, and then joined with the sample liquid in a manner interposing the sample liquid between the two directions at a joined portion with the sample liquid introduced from the sample introduction unit M3. Consequently, a three-dimensional laminar flow in which the sample liquid laminar flow is positioned in a middle of the sheath liquid laminar flows is formed at the joint portion.

Reference sign M5 illustrated in FIG. 7A indicates a suction flow path to eliminate clogging or air bubbling by temporarily reversing a flow by applying negative pressure to the inside of the sample flow path M2 when such clogging or air bubbling occurs in the sample flow path M2. The suction flow path M5 has one end formed with a suction open portion M51 connected to a negative pressure source such as a vacuum pump or the like. Additionally, the suction flow path M5 has the other end connected to the sample flow path M2 at a communication port M52.

A laminar flow width of the three-dimensional laminar flow is narrowed at narrowed portions M61 (refer to FIGS. 7A and 7B) and M62 (refer to FIG. 8B) each formed such that the area of a vertical cross-section relative to a liquid feeding direction is gradually reduced from an upstream side to a downstream side of the liquid feeding direction. After that, the three-dimensional laminar flow is drained as a fluid stream from the orifice M1 provided at the one end of the flow path.

The fluid stream ejected from the orifice M1 is made into droplets by applying vibration to the orifice M1 by a vibration element 106a described below. The orifice M1 is opened in a direction to end surfaces of the substrate layers Ma and Mb, and a cut-away portion M11 is provided between the opened position and the end surfaces of the substrate layers. The cut-away portion M11 is formed by cutting the substrate layers Ma and Mb between the opened position of the orifice M1 and the substrate end surfaces such that a diameter L1 of the cut-away portion M11 becomes larger than an open diameter L2 of the orifice M1 (refer to FIG. 8C). Preferably, the diameter L1 of the cut-away portion M11 is formed twice or more than the open diameter L2 of the orifice M1 so as not to hinder movement of a droplet ejected from the orifice M1.

(1-2) Flow Cell P

The flow cell P includes: a sample introduction unit P3 to introduce a sample; a sheath introduction unit P4 to introduce sheath liquid; a flow path P2 forming a laminar flow in which sheath liquid and the sample are joined and a sample liquid laminar flow is positioned in the middle of sheath liquid laminar flows; and an orifice P1. A fluid stream is effluent from the orifice P1, and characteristics of a microparticle are detected by the later-described light emission unit 103 and light detection unit 104 included in the microparticle measurement device 100.

(2) Sample Feeding Unit 101

The sample feeding unit 101 feeds a sample to the sample introduction units M3 and P3 via a sample liquid feeding tube and a sample introduction coupling portion C1 described below. For example, the sample feeding unit 101 can suck and feed a sample via a nozzle from a test tube, a well plate, or the like containing the sample, or can also feed a sample by applying pressure to a housing unit that can house a test tube or the like containing the sample.

(3) Fluid Control Unit 102

Figure 9:
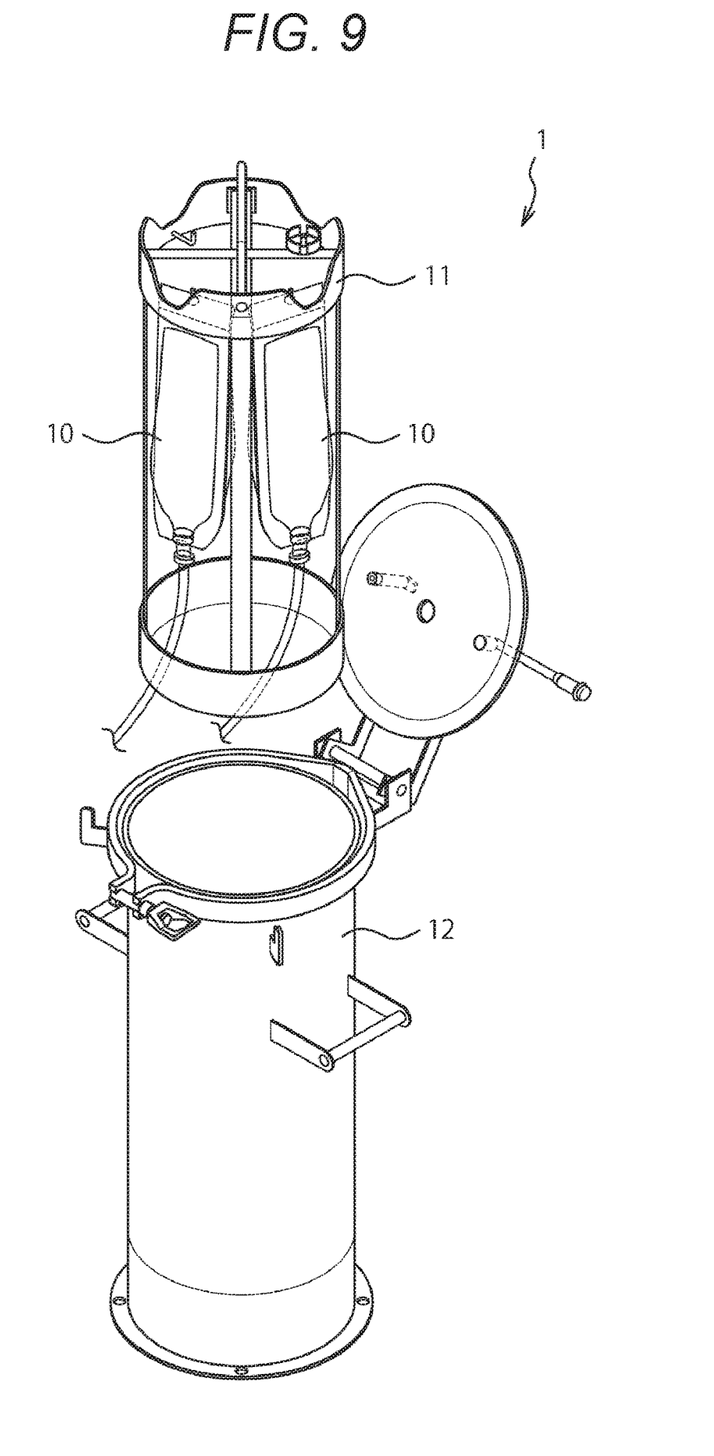
FIG. 9 is a schematic view illustrating an example of an embodiment of a sheath liquid feeding unit 1.

The fluid control unit 102 includes the sheath liquid feeding unit 1 to introduce sheath liquid to the sheath liquid introduction unit M4. FIG. 9 is a schematic view illustrating an example of an embodiment of the sheath liquid feeding unit 1, and the sheath liquid feeding unit includes: a support portion 11 where a sheath liquid storage unit 10 can be attached; and a sealed portion 12. For example, the sheath liquid inside the sheath liquid storage unit 10 is fed to the sheath liquid introduction unit M4 via the above-described sheath liquid feeding tube 2 and a sheath liquid introduction coupling portion C2 by pressure applied to the sealed portion 12.

Figure 10:
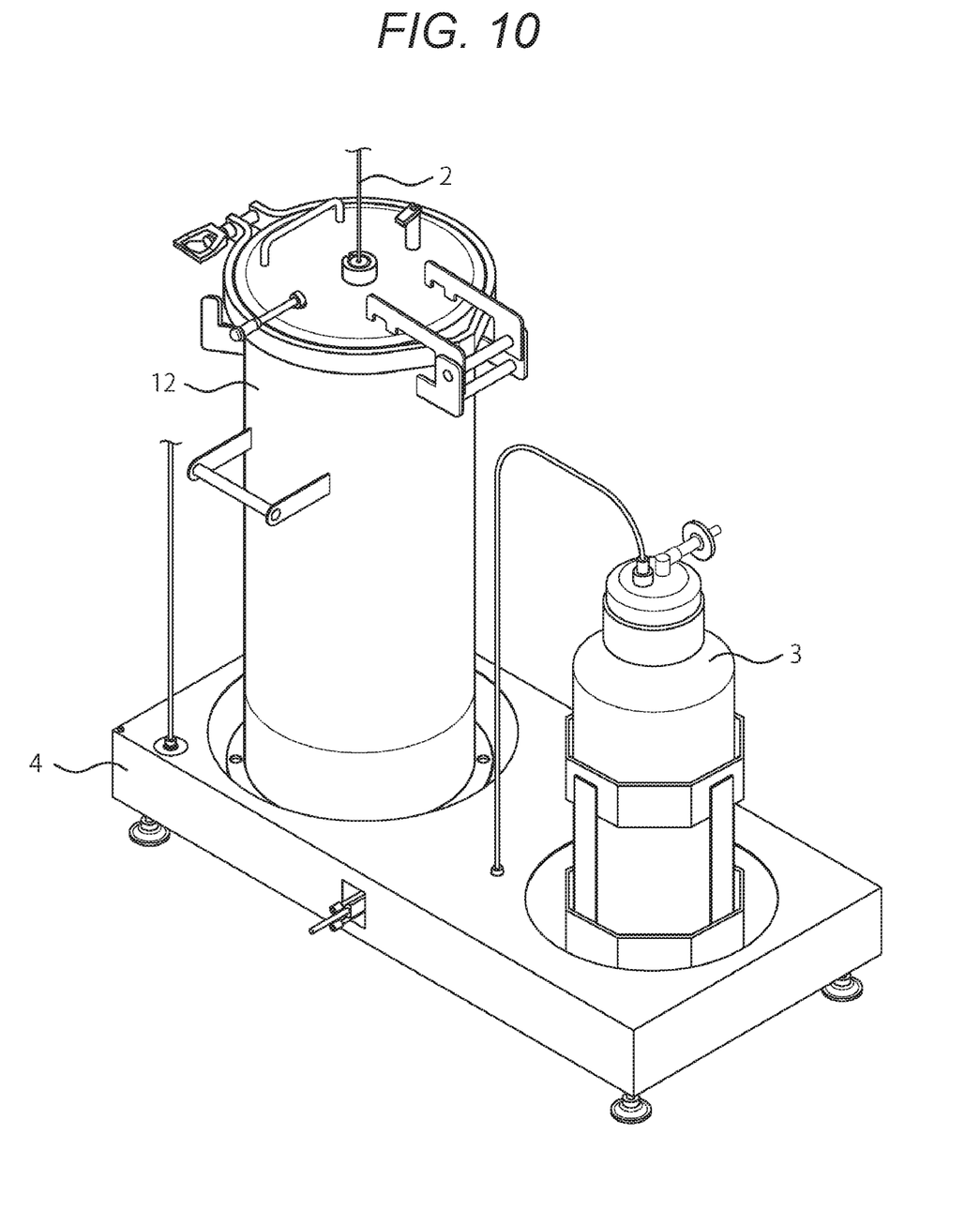
FIG. 10 is a schematic view illustrating an example of an embodiment of a fluid control unit 102.

FIG. 10 is a schematic view illustrating an example of an embodiment of the fluid control unit 102, and the fluid control unit 102 further includes the liquid drain unit 3. For example, clogging, air bubbles, and the like in the sample flow path M2 are recovered from the suction open portion M51 via the above-described liquid drain tube and a drain coupling portion C4 by a pump function or the like. Additionally, the liquid drain unit 3 can also be connected to the sorting unit 106 in order to suck a droplet not sorted in the sorting unit 106 described below, aerosol, and the like.

Furthermore, as illustrated in FIG. 10, the fluid control unit 102 may include an installation table 4 on which the sheath liquid feeding unit 1 and the liquid drain unit 3 can be installed. A drain control unit can be provided on the installation table 4 but can also be provided at a place other than the installation table 4 as a member of the control unit 110 described below.

Additionally, the fluid control unit 102 may be formed separately from the microparticle measurement device 100 or may be formed as a part of the microparticle measurement device 100.

(4) Connection Member C

Figure 11:
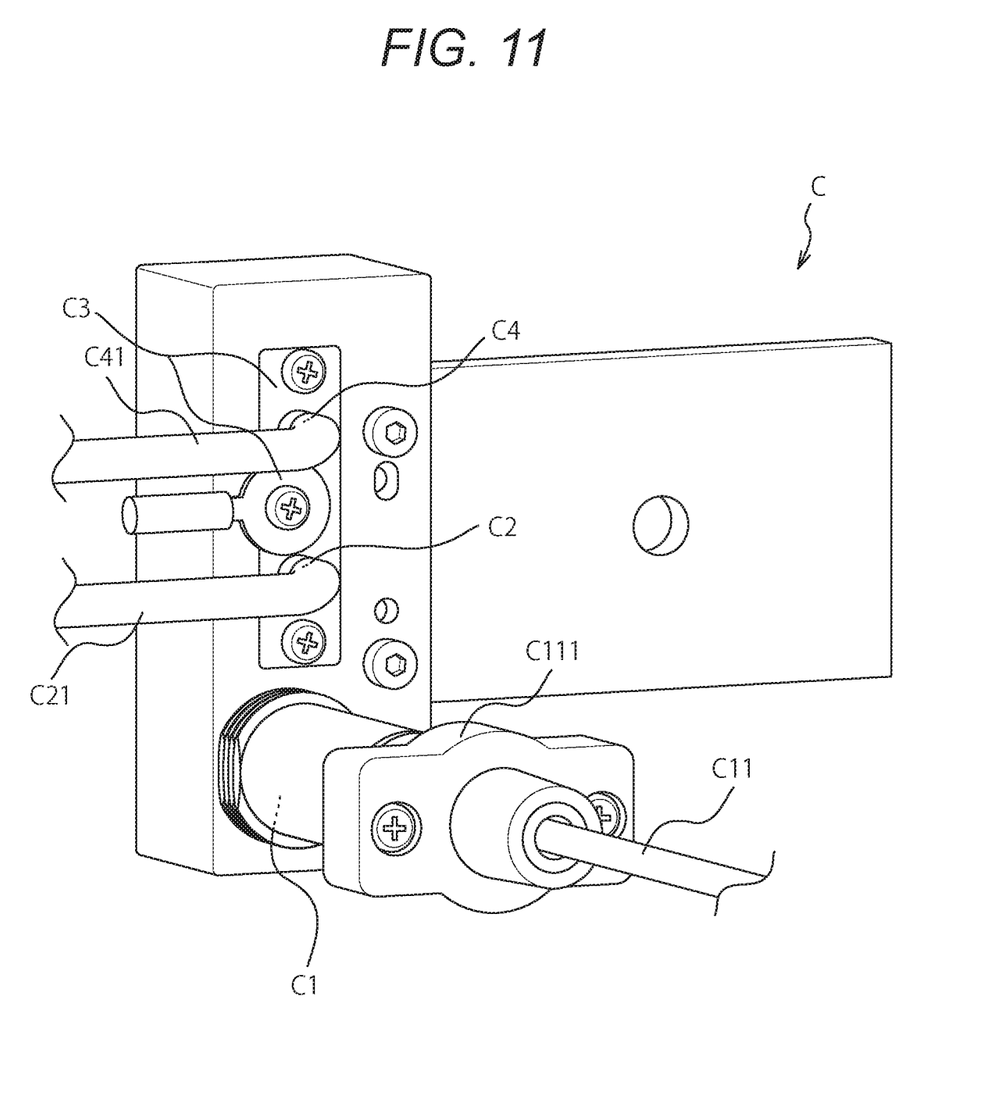
FIG. 11 is a schematic view illustrating an example of an embodiment of a connection member C.

FIG. 11 is a schematic view illustrating an example of an embodiment of the connection member C that connects the microparticle measurement chip M to the sample feeding unit 101/fluid control unit 102 in the microparticle measurement device 100 of FIG. 5. The connection member C of the present embodiment includes: the sample introduction coupling portion C1 coupled to the sample introduction unit M3; the sheath liquid introduction coupling portion C2 coupled to the sheath liquid introduction unit M4; a charging electrode portion C3 to apply electric charge to at least a part of droplets; and the drain coupling portion C4 coupled to the suction open portion M51, and the sample introduction coupling portion C1, the sheath liquid introduction coupling portion C2, and the drain coupling portion C4 are positioned so as to be coupled to respective corresponding positions of the substrate.

Since the connection member C detachable from the microparticle measurement chip M and the microparticle measurement device 100 is used, a portion in contact with the microparticle measurement chip M can be detached and the risk of contamination can be reduced. Additionally, since the above-described microparticle measurement chip M and connection member C are made disposable per sample, labor of cleaning operation performed at the time of changing a sample can be omitted and a burden on an operator can be reduced.

Figure 12:
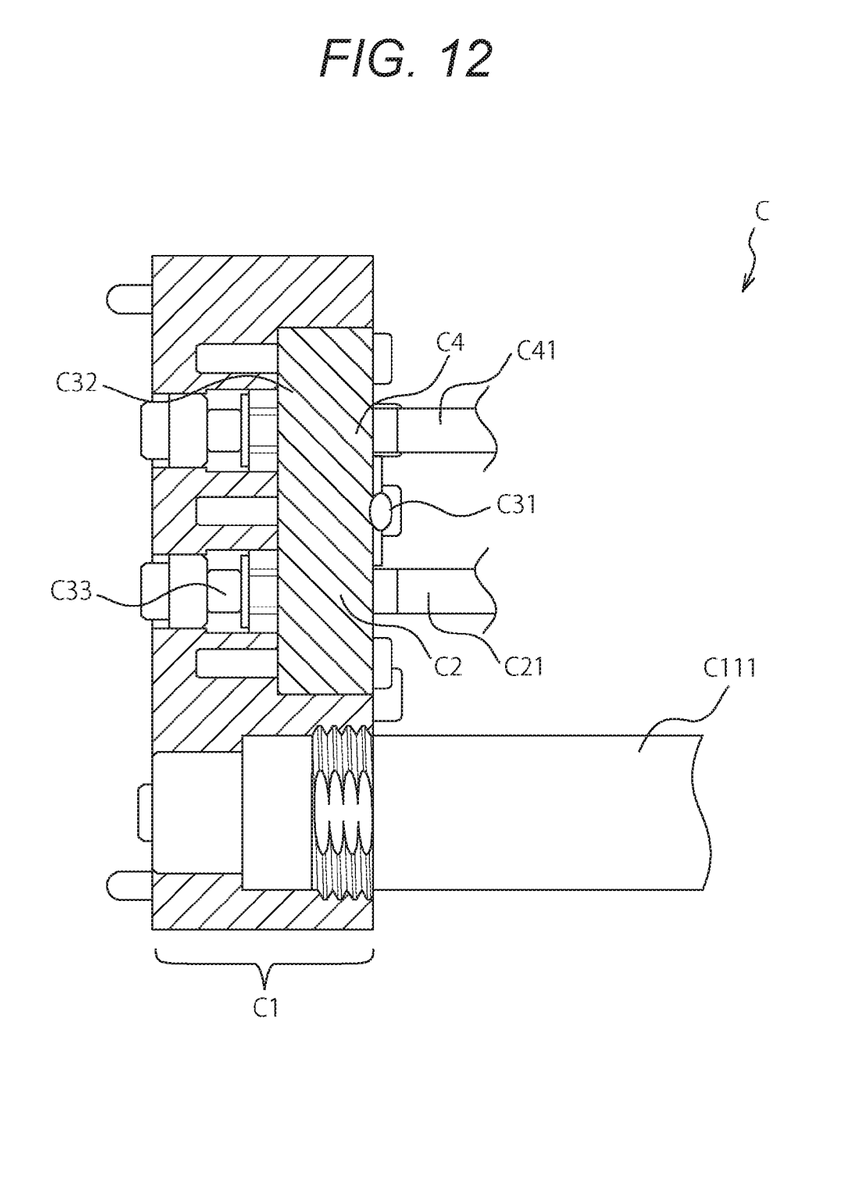
FIG. 12 is a schematic end surface view of the connection member C in the embodiment illustrated in FIG. 11.

Furthermore, the charging electrode portion C3 contacts the sheath liquid introduction coupling portion C2 and can apply electric charge to at least a part of droplets through the sheath liquid. A configuration of the charging electrode portion C3 is not particularly limited, but can include: connection portions C31/C32 connected to the charging unit 1061; and a contact portion C33 contacting the sheath liquid introduction coupling portion C2, as illustrated in FIG. 12, for example. Details of the charging unit 1061 will be described after (8) the sorting unit 106.

Furthermore, the connection portions C31/C32 and the contact portion C33 preferably includes metals. Meanwhile, since the metals used for the connection portions C31/C32 and the contact portion C33 are made disposable, labor of cleaning operation performed at the time of changing a sample can be omitted and a burden on an operator can be reduced.

Additionally, as illustrated in FIGS. 11 and 12, the sheath liquid introduction coupling portion C2 also includes: the liquid feeding tube C21 capable of feeding liquid from the sheath liquid feeding unit 1; the liquid feeding tube C11 capable of feeding liquid from the sample feeding unit 101; and the liquid drain tube C41 capable of draining liquid to the liquid drain unit 3. These tubes can also have a similar configuration detachable from the microparticle measurement chip M and the microparticle measurement device 100 and can be made disposable per sample.

(5) Light Emission Unit 103

Since the light emission unit 103 corresponds to that described above, the description will be omitted here.

(6) Light Detection Unit 104

Since the light detection unit 104 corresponds to that described above, the description will be omitted here. Note that the light detection unit 104 can also include a plurality of light detection units although the light detection unit 104 has been described above as a single light detection unit in FIGS. 5 and 6.

(7) Analysis Unit 105

Since the analysis unit 105 corresponds to that described above, the description will be omitted here.

(8) Sorting Unit 106 (Including Charging Unit 1061)

The sorting unit 106 includes at least: the vibration element 106a that generates a droplet; a deflection plate 106b that changes the charged droplet in a desired direction; and a collection container that collects droplets. The charging unit 1061 is separately defined in FIGS. 5 and 6, but the charging unit is a part of the sorting unit 106 and performs charging on the basis of a sorting control signal generated by the analysis unit 105.

In the microparticle measurement device 100 illustrated in FIG. 5, the vibration element 106a generates a droplet by applying vibration to the orifice M1 as described above. The charging unit 1061 is connected to the charging electrode portion C3 coupled to the above-described sheath liquid flow introduction coupling portion C2, and charges positively or negatively the droplet ejected from the orifice M1 of the microparticle measurement chip M on the basis of a sorting control signal generated by the analysis unit 105.

On the other hand, in the microparticle measurement device 100 illustrated in FIG. 6, the vibration element 106a generates a droplet by applying vibration to a fluid stream ejected from the orifice M1, and the charging unit 1061 positively or negatively charges the droplet on the basis of a sorting control signal generated by the analysis unit 105.

Then, an advancing direction of the charged droplet is changed and sorted in a desired direction by the deflection plate (counter electrode) 106b to which voltage is applied.

Note that the vibration element 106a to be used is not particularly limited and any known vibration element can be freely selected and used. As an example, a piezo vibration element or the like can be exemplified. Additionally, a size of a droplet can be adjusted by adjusting a liquid feeding amount to the flow path P, a diameter of an ejection port, a vibration frequency of the vibration element 106a, and the like, and a droplet containing a constant amount of microparticles can be generated.

(9) Storage Unit 107

The storage unit 107 stores all of matters related to measurement such as a value detected by the light detection unit 104, a feature quantity calculated by the analysis unit 105, a sorting control signal, a sorting condition input from the input unit 109, and the like.

In the microparticle measurement device 100, the storage unit 107 is not an indispensable component, and an external storage device may also be connected. As the storage unit 107, for example, a hard disk or the like can be used. Furthermore, the storage unit 107 may be connected to each of the units via a network.

(10) Display Unit 108

The display unit 108 can display all of matters related to measurement such as a value detected by the light detection unit 104, a feature quantity calculated by the analysis unit 105, and the like. Preferably, the display unit 108 can display, as a scattergram, a feature quantity calculated by the analysis unit 105 for each microparticle.

In the microparticle measurement device 100, the display unit 108 is not an indispensable component, and an external display device may be connected. As the display unit 108, for example, a display, a printer, or the like can also be used.

(11) Input Unit 109

The input unit 109 is a portion operated by a user such as an operator. A user can access the control unit 110 through the input unit 109 to control each of the units of the microparticle measurement device 100 according to the present technology. Preferably, the input unit 109 can set an attention area for a scattergram displayed on the display unit and determine a sorting condition.

In the microparticle measurement device 100, the input unit 109 is not an indispensable component, and an external operating device may also be connected. As the input unit 109, for example, a mouse, a keyboard, or the like can also be used.

(12) Control Unit 110

The control unit 110 is configured capable of controlling each of the sample feeding unit 101, fluid control unit 102, light emission unit 103, light detection unit 104, analysis unit 105, sorting unit 106, charging unit 1061, storage unit 107, display unit 108, and input unit 109. The control unit 110 may be provided separately for each of the units, and furthermore, may be provided outside the microparticle measurement device 100. For example, the control unit may be implemented by a personal computer or a CPU, and can be made to function by the personal computer or the CPU by further storing the same as a program in a hardware resource including recording media (nonvolatile memory (USB memory and the like), HDD, CD, and the like) and the like. Additionally, the control unit 110 may be connected to each of the units via a network.

(13) Others

The microparticle measurement device 100 according to the present technology can be housed in a biosafety cabinet. Since the microparticle measurement device is housed in the biosafety cabinet, it is possible to prevent: scattering to a surrounding area including a user; and sample contamination. The fluid control unit 102 is not necessarily housed in the biosafety cabinet and can be connected to the microparticle measurement device 100 via each tube at an opened portion on a wall surface of the biosafety cabinet.

Additionally, each of the units of the microparticle measurement device 100 has a configuration that can be cleaned in order to prevent sample contamination. Particularly, the housing 1000 including the sample feeding unit 101, flow path P, and sorting unit 106 each of which possibly contacts a sample preferably has a configuration that can be cleaned.

3. Cleaning Method for Microparticle Measurement Device

In a cleaning method for a microparticle measurement device according to the present technology, the microparticle measurement device 100 is cleaned by moving the light detection unit 104 from the detection position in the microparticle measurement device 100 that includes at least: the light emission unit 103 that emits light to a microparticle to be analyzed; the light detection unit 104 that detects light generated from a microparticle at a predetermined detection position, and the analysis unit 105 that is connected to the light detection unit 104 and analyzes a detection value of the light detected by the light detection unit 104, in which the light detection unit 104 is movable from the detection position. Since the microparticle measurement device 100, light emission unit 103, light detection unit 104, and analysis unit 105 correspond to those described above, the description will be omitted here.

Note that the present technology can have following configurations as well.

(1)
A microparticle measurement device including at least:
a light emission unit that emits light to a microparticle to be analyzed;
a light detection unit that detects light generated from the microparticle at a predetermined detection position; and
an analysis unit that is connected to the light detection unit and analyzes a detection value of the light detected by the light detection unit,
in which the light detection unit is movable from the detection position.

(2)
The microparticle measurement device recited in (1), in which the light detection unit is a forward scattered light detection unit.

(3)
The microparticle measurement device recited in (1) or (2), in which the detection position is a position facing the light emission unit interposing the microparticle, and the detection position is a preset position such that light generated from the microparticle can be detected.

(4)
The microparticle measurement device recited in any one of (1) to (3), further including a rotational shaft portion that is connected to the light detection unit and defines a predetermined rotational axis,
in which the light detection unit is rotatable around the predetermined axis with respect to the detection position.

(5)
The microparticle measurement device recited in (4), in which the light detection unit can be moved upward with respect to the detection position while being rotated around the predetermined axis.

(6)
The microparticle measurement device recited in any one of (1) to (5), in which the light detection unit is movable in at least one of a horizontal direction or a vertical direction with respect to the detection position.

(7)
The microparticle measurement device recited in any one of (1) to (6), further including a housing in which the light emission unit and the analysis unit are housed,
in which the light detection unit can be completely separated from the housing.

(8)
The microparticle measurement device recited in any one of (1) to (7), in which the analysis unit is electrically connected to the light detection unit.

(9)
The microparticle measurement device recited in any one of (1) to (8), in which the light detection unit includes a light receiving element that receives light generated from the microparticle.

(10)
The microparticle measurement device recited in (9), in which the light detection unit includes a light shielding portion that is arranged between the light emission unit and the light receiving element and shields a part of light generated from the microparticle.

(11)
The microparticle measurement device recited in any one of (1) to (10), further including:
a housing in which the light emission unit and the analysis unit are housed; and
a cover detachable from the housing,
in which the light detection unit can be covered with the cover.

(12) A cleaning method for a microparticle measurement device, including cleaning the microparticle measurement device by moving a light detection unit from a detection position in the microparticle measurement device including at least: a light emission unit that emits light to a microparticle to be analyzed; the light detection unit that detects light generated from the microparticle at the predetermined detection position; and an analysis unit that is connected to the light detection unit and analyzes a detection value of the light detected by the light detection unit, the light detection unit being movable from the detection position.

REFERENCE SIGNS LIST

100 Microparticle measurement device
101 Sample feeding unit
102 Fluid control unit
103 Light emission unit
104 Light detection unit
1041 Forward scattered light detection unit
1042 Fluorescence detection unit
1043 Backscattered light detection unit
105 Analysis unit
106 Sorting unit
106a Vibration element
106b Deflection plate
1061 Charging unit
107 Storage unit
108 Display unit
109 Input unit
110 Control unit
111 Optical filter
1000 Housing
1011 Rotational shaft portion
1 Sheath liquid feeding unit
10 Sheath liquid storage unit
11 Support portion
12 Sealed portion
2 Sheath liquid feeding tube
3 Liquid drain unit
4 Installation table
P Flow path
R1 Laser beam
R2 Scattered light
BSC Backscattered light
FL Fluorescence
FSC Forward scattered light
S Light shielding portion
PD Light receiving element
M Microparticle measurement chip
Ma, Mb Substrate layer
M1 Orifice
M11 Cut-away portion
M2 Sample flow path
M3 Sample introduction unit
M4 Sheath introduction unit
M5 Suction flow path
M51 Suction open portion
M52 Communication port
M61, M62 Narrowed portion
M7 Straight portion
L1 Diameter of cut-away portion M11
L2 Open diameter of orifice M1
C Connection member
C1 Sample introduction coupling portion
C11 Liquid feeding tube capable of feeding liquid from sample feeding unit
C111 Tube fixing portion
C2 Sheath liquid introduction coupling portion
C21 Liquid feeding tube capable of feeding liquid from sheath liquid feeding unit
C3 Charging electrode portion
C31, C32 Connection portion
C33 Contact portion
C4 Drain coupling portion
C41 Liquid drain tube capable of draining liquid to liquid drain unit

The invention claimed is:

1. A microparticle measurement device, comprising:
a light emission unit configured to emit first light to a microparticle;
a light detection unit configured to detect, at a specific detection position, second light generated from the microparticle;
an analysis unit connected to the light detection unit, wherein
the analysis unit is configured to analyze a detection value of the second light detected by the light detection unit, and
the light detection unit is movable from the specific detection position; and
a rotational shaft portion connected to the light detection unit, wherein
the rotational shaft portion is configured to define a specific rotational axis, and
the light detection unit is rotatable around the specific rotational axis with respect to the specific detection position, wherein the light detection unit is movable from the specific detection position to clean the microparticle measurement device.

2. The microparticle measurement device according to claim 1, wherein the light detection unit is a forward scattered light detection unit.

3. The microparticle measurement device according to claim 1, wherein
the specific detection position faces the light emission unit interposing the microparticle, and
the specific detection position is a preset position such that the second light generated from the microparticle is detectable.

4. The microparticle measurement device according to claim 1, wherein
the light detection unit is movable upward with respect to the specific detection position, and
the upward movement of the light detection unit is concurrent with the rotation of the light detection unit around the specific rotational axis.

5. The microparticle measurement device according to claim 1, wherein the light detection unit is movable in at least one of a horizontal direction or a vertical direction with respect to the specific detection position.

6. The microparticle measurement device according to claim 1, further comprising a housing that houses the light emission unit and the analysis unit,
wherein the light detection unit is completely separable from the housing.

7. The microparticle measurement device according to claim 1, wherein the analysis unit is electrically connected to the light detection unit.

8. The microparticle measurement device according to claim 1, wherein the light detection unit includes a light receiving element configured to receive the second light generated from the microparticle.

9. The microparticle measurement device according to claim 8, wherein
the light detection unit further includes a light shielding portion between the light emission unit and the light receiving element, and
the light shielding portion is configured to shield a part of the second light generated from the microparticle.

10. The microparticle measurement device according to claim 1, further comprising:
a housing that houses the light emission unit and the analysis unit; and
a cover detachable from the housing,
wherein the light detection unit is coverable by the cover.

11. A cleaning method for a microparticle measurement device, comprising:
moving a light detection unit from a specific detection position in the microparticle measurement device; and
cleaning the microparticle measurement device based on the movement of the light detection unit,
wherein the microparticle measurement device includes:
a light emission unit configured to emit first light to a microparticle;
the light detection unit configured to detect, at the specific detection position, second light generated from the microparticle;
an analysis unit connected to the light detection unit, wherein the analysis unit is configured to analyze a detection value of the second light detected by the light detection unit; and
a rotational shaft portion connected to the light detection unit, wherein
the rotational shaft portion is configured to define a specific rotational axis, and
the light detection unit is rotatable around the specific rotational axis with respect to the specific detection position.

* * * * *